Patented Jan. 10, 1933

1,893,868

UNITED STATES PATENT OFFICE

HAROLD A. MORTON, OF AKRON, OHIO

VULCANIZATION OF RUBBER

No Drawing.　　Application filed September 30, 1929.　Serial No. 396,386.

My invention relates to the vulcanization of rubber and its object is to improve the properties of the articles made from a vulcanizable compound. The invention finds a particular field of usefulness in permitting the employment of low grade inferior types of raw rubber in a compound in lieu of higher quality and more expensive grades.

Vulcanized articles made from compounds in which the highest quality crude rubber is employed, such as "smoked sheets", frequently show considerable variation in vulcanization characteristics, or properties. In other words, different rubber stocks, utilizing what are believed to be the same ingredients, when vulcanized under constant conditions, result in vulcanized products varying greatly in their physical properties. Attempts have been made to obviate this by carefully blending different batches of high grade raw rubber, but this has not proved satisfactory, and moreover, involves considerable expense.

In the manufacture of many articles from vulcanized rubber heretofore it has not been feasible to utilize in the stocks, or compounds, in any material amount, low grade rubbers, such, for example, as those commercially known as "Rolled brown crepe," "Guayule," "Caucho ball," "Blanket crepe," etc., for the reason that the vulcanized product fails to exhibit the desired qualities, and such products are not comparable to products made from stocks having high quality rubber incorporated in them.

Practically the only use to which the low grade rubbers have been put is as a diluent of high grade rubbers, and the quantity which can be used in this way is very limited.

This has resulted in a very limited commercial market for such low grade rubbers and they bring a much lower price than that demanded for the so-called high grade rubbers.

I have made the discovery that: (1) high grade rubbers can be made much more uniform in vulcanization characteristics and (2) low grade inferior rubbers can be brought up to practically the same rate of vulcanization, high tensile strength and uniformity, as the high grade rubbers, by adding to the rubber mixture, containing the ordinary compounding ingredients, an organic accelerator preferably of the aldehyde amine type and a certain quantity of sodium acetate.

This results in being able to make a rubber product from low grade inferior rubber, having the vulcanization, tensile strength and wearing characteristics of an article manufactured from high grade rubber.

The materials which I have found to be particularly effective for carrying out this process are alpha ethyl beta propyl acryl aniline and crystalline, hydrated sodium acetate.

Various other accelerators of the aldehyde amine type when used in conjunction with hydrated sodium acetate exhibit the same property to varying degrees.

Among the materials which may be advantageously used in conjunction with hydrated sodium acetate in carrying out this invention, may be mentioned the following:—

Alpha ethyl beta propyl acrolein derivatives, alpha ethyl beta methyl acrolein derivatives, ethylidene aniline, ethylidene toluidine, ethylidene ethylene diamine, butylidene aniline, butylidene alpha phenyl biguanidine, butylidene ethylene diamine, crotylidene aniline, crotylidene ethylene diamine, heptylidene aniline, heptylidene ethylene diamine. All of the well known aldehyde amine accelerators and modifications of the same, act in the manner described above when used in conjunction with hydrated sodium acetate.

The invention can also be carried out by using mixtures of accelerators, one of which is preferably an aldehyde amine type, this mixture being used in a rubber batch in conjunction with hydrated sodium acetate. Examples of such mixtures are:

Mercaptobenzothiazole + ethylidene aniline

Mercaptobenzothiazole + alpha ethyl beta propyl acryl aniline.

Tetra methyl thiuram disulphide + ethylidene aniline.

Tetra methyl thiuram disulphide + butylidene aniline.

While the preferred method of practicing the invention is to employ an aldehyde-amine type accelerator in conjunction with hydrated sodium acetate, the invention can also be employed by using hydrated sodium acetate in the absence of organic accelerator.

It is found that considerable improvement is obtained by the addition of sodium acetate to a rubber compound containing the usual compounding ingredients but no organic accelerator.

It is also possible to practice the invention by using other types of organic accelerators such as, for example:—

Mercaptobenzothiazole para nitroso dimethyl aniline, etc. It has also been found that certain types of synthetic rubbers are beneficially affected by the use of hydrated sodium acetate.

The above materials serve only as indications of the breadth of the invention and it is not restricted to the use of the materials mentioned.

The invention is preferably practiced by the use of any aldehyde amine or aldehyde amine mixture which functions as an accelerator in the vulcanization of rubber, the accelerator being used in co-operation with hydrated sodium acetate in the rubber batch.

The hydrated sodium acetate may be mixed with the accelerator before addition to the rubber but the preferred method is to add the ingredients separately.

In practicing the invention, the rubber batch is mixed in the usual manner, using the appropriate quantity of organic accelerator to yield the desired rate of vulcanization and approximately 0.75 percent hydrated sodium acetate is added to the batch.

It has been found that quantities from 0.25 percent to 2.0 percent hydrated sodium acetate may be employed to obtain beneficial results and in general 0.75 percent is sufficient to yield the desired result.

It has also been found that anhydrous sodium acetate as well as partially hydrated sodium acetate may be employed with beneficial results but the invention is practiced the most advantageously by using hydrated sodium acetate having the formula $$CH_3COO\ Na.3H_2O.$$

Among the equivalents of sodium acetate for practicing the invention may be mentioned, potassium acetate, ammonium acetate.

The invention and its advantages is illustrated by the following specific examples:—

EXAMPLE 1

*Vulcanization of "Caucho ball" by the use of alpha ethyl beta propyl acryl aniline and hydrated sodium acetate*

Two rubber stocks were separately mixed using the identical sample of "Caucho ball" in both cases and the curing curves determined under the same conditions.

The composition of the two rubber stocks were as follows:—

Stock A:
"Caucho ball" rubber_____ 94.65
Zinc oxide_____ 2.0
Sulphur_____ 3.0
Alpha ethyl beta propyl acryl aniline 0.35

Stock B:
"Caucho ball" rubber_____ 93.90
Zinc oxide_____ 2.0
Sulphur_____ 3.0
Alpha ethyl beta propyl acryl aniline 0.35
Hydrated sodium acetate_____ 0.75

Upon mixing, curing and testing the following results were obtained.

| Cure | Stock A | | Stock B | |
|---|---|---|---|---|
| | Tensile (#/Sq. in.) | Elongation | Tensile (#/Sq. in.) | Elongation |
| | | Per cent | | Per cent |
| 10′ x 40#__ | 1025 | 970 | 3220 | 890 |
| 20′ x 20#__ | 1200 | 960 | 3585 | 870 |
| 30′ x 40#__ | 1455 | 970 | 3455 | 810 |
| 40′ x 40#__ | 1415 | 940 | 3320 | 800 |
| 50′ x 40#__ | 715 | 900 | 3350 | 810 |

EXAMPLE 2

*Vulcanization of "Guayule" by the use of alpha ethyl beta propyl acryl aniline and hydrated sodium acetate*

The following figures show the improvement obtained by using the above mixture of ingredients in two different shipments of Guayule rubber.

The stock recipes for the two lots were the same and consisted of the following:

Stock A
"Guayule" rubber_____ 90.9
Zinc oxide_____ 5.75
Sulphur_____ 3.0
Alpha ethyl beta propyl acryl aniline_____ 0.35

Stock B
"Guayule" rubber_____ 90.9
Zinc oxide_____ 5.0
Sulphur_____ 3.0
Alpha ethyl beta propyl acryl aniline_____ 0.35
Hydrated sodium acetate _____ 0.75

The mixing and vulcanization on all stocks were carried out under uniform conditions with the following results:—

| Cure | "Guayule" rubber lot #1 | | | | "Guayule" rubber lot #2 | | | |
|---|---|---|---|---|---|---|---|---|
| | Stock A | | Stock B | | Stock A | | Stock B | |
| | Tensile | Elongation | Tensile | Elongation | Tensile | Elongation | Tensile | Elongation |
| | | Per cent | | Per cent | | Per cent | | Per cent |
| 10' x 40# | 1655 | 950 | 2510 | 750 | 1260 | 960 | 2295 | 800 |
| 20' x 40# | 1240 | 950 | 2555 | 700 | 1175 | 930 | 2730 | 770 |
| 30' x 40# | 825 | 970 | 2540 | 670 | 1210 | 950 | 2475 | 730 |
| 40' x 40# | 665 | 980 | 2490 | 650 | 1280 | 990 | 2890 | 720 |
| 50' x 40# | 510 | 1040 | 2275 | 660 | 995 | 990 | 2445 | 680 |
| 60' x 40# | 455 | 1050 | 2075 | 660 | 920 | 1000 | 2550 | 680 |

The above results demonstrate that the low and variable tensile strength of the "Guayule" rubber is increased and made uniform by the joint use of alpha ethyl beta propyl acryl aniline and hydrated sodium acetate. The tests also demonstrate the failure of the accelerator alone to produce this effect.

EXAMPLE 3

*Vulcanization of "Up-river coarse para" by use of alpha ethyl beta propyl acryl aniline and hydrated sodium acetate*

Two different shipments of "Up-river coarse para" were compounded and tested using the ingredients above named. The two lots of rubber were treated in the indentical manner, each lot of rubber being tested in two compounds, as follows:—

Stock A
"Up-river coarse para" _____ 93.9
Zinc oxide _____ 2.0
Sulphur _____ 3.0
Alpha ethyl beta propyl acryl aniline _____ 0.35

Stock B
"Up-river coarse para" _____ 93.9
Zinc oxide _____ 2.0
Sulphur _____ 3.0
Alpha ethyl beta propyl acryl aniline _____ 0.35
Hydrated sodium acetate _____ 0.75

| Cure | Up-river coarse para, lot #1 | | | | Up-river coarse para, lot #2 | | | |
|---|---|---|---|---|---|---|---|---|
| | Stock A | | Stock B | | Stock A | | Stock B | |
| | Tensile | Elongation | Tensile | Elongation | Tensile | Elongation | Tensile | Elongation |
| | | Per cent | | Per cent | | Pe cent | | Per cent |
| 10' x 40# | 1075 | 900 | 2170 | 850 | 1120 | 900 | 1990 | 820 |
| 20' x 40# | 995 | 830 | 2770 | 780 | 1170 | 860 | 2750 | 750 |
| 30' x 40# | 1140 | 840 | 3060 | 770 | 970 | 870 | 2920 | 740 |
| 40' x 40# | 1075 | 810 | 3055 | 740 | 915 | 870 | 3010 | 740 |
| 50' x 40# | 1125 | 850 | 2985 | 740 | 735 | 850 | 2760 | 740 |

The above results indicate the remarkable effect of the above mixture of ingredients on the curing curve and tensile strengths of different lots of "Up-river coarse para" rubber.

EXAMPLE 4

*Vulcanization of "Blanket crepe" by use of butylidene aniline and hydrated sodium acetate*

Two rubber stocks for each of two lots of "Blanket Crepe" rubber were mixed having the following composition:—

Stock A
"Blanket crepe" _____ 94.5
Zinc oxide _____ 2.0
Sulphur _____ 3.0
Butylidene aniline _____ 0.5

Stock B
"Blanket crepe" _____ 93.75
Zinc oxide _____ 2.0
Sulphur _____ 3.0
Butylidene aniline _____ 0.5
Hydrated sodium acetate _____ 0.75

| Cure | "Blanket crepe" #1 | | | | "Blanket crepe" #2 | | | |
|---|---|---|---|---|---|---|---|---|
| | Stock A | | Stock B | | Stock A | | Stock B | |
| | Tensile | Elongation | Tensile | Elongation | Tensile | Elongation | Tensile | Elongation |
| | | Per cent | | Per cent | | Per cent | | Per cent |
| 10'x40# | 750 | 900 | 1505 | 840 | 1230 | 890 | 2040 | 830 |
| 20'x40# | 1865 | 850 | 2745 | 790 | 1325 | 850 | 3100 | 770 |
| 30'x40# | 2450 | 790 | 3195 | 760 | 1440 | 830 | 3405 | 750 |
| 40'x40# | 2610 | 790 | 3320 | 750 | 1465 | 820 | 3290 | 740 |
| 50'x40# | 2590 | 780 | 3405 | 730 | 995 | 840 | 3080 | 730 |

The above results show the decrease in variability and the increase in tensile strength when "Blanket crepe" is vulcanized with the above mixture of ingredients.

EXAMPLE 5

*Vulcanization of "Blanket crepe" by use of ethylidene aniline and hydrated sodium acetate*

Tests made on three different shipments of "Blanket crepe" by the use of the above named ingredients are given in this example. Each shipment was tested by compounding the following recipes, the mixing and curing conditions being identical.

Stock A
"Blanket crepe" _____ 94.5
Zinc oxide _____ 2.0
Sulphur _____ 3.0
Ethylidene aniline _____ 0.5

Stock B
"Blanket crepe" _____ 93.75
Zinc oxide _____ 2.0
Sulphur _____ 3.0
Ethylidene aniline _____ 0.5
Hydrated sodium acetate _____ 0.75

| Cure | "Blanket crepe" #1 | | | | "Blanket crepe" #2 | | | | "Blanket crepe" #3 | | | |
|---|---|---|---|---|---|---|---|---|---|---|---|---|
| | Stock A | | Stock B | | Stock A | | Stock B | | Stock A | | Stock B | |
| | Tensile | Elongation | Tensile | Elongation | Tensile | Elongation | Tensile | Elongation | Tensile | Elongation | Tensile | Elongation |
| | | Per cent | | Per cent | | Per cent | | Per cent | | Per cent | | Per cent |
| 10'x40# | 730 | 890 | 1430 | 920 | 1125 | 980 | 1565 | 940 | 200 | 1050 | 1640 | 1010 |
| 20'x40# | 875 | 930 | 2120 | 850 | 2265 | 940 | 2380 | 930 | 315 | 970 | 2440 | 910 |
| 30'x40# | 860 | 890 | 2280 | 820 | 2550 | 930 | 2855 | 870 | 460 | 950 | 2870 | 850 |
| 40'x40# | 885 | 900 | 3215 | 800 | 2745 | 910 | 3010 | 860 | 405 | 920 | 3180 | 860 |
| 50'x40# | 985 | 900 | 3360 | 790 | 2780 | 910 | 3135 | 860 | 500 | 930 | 3205 | 810 |

EXAMPLE 6

*Vulcanization of "Rolled brown crepe" by use of alpha ethyl beta propyl acryl aniline abietate and ammonium acetate*

This example demonstrates the action of the above named ingredients on two different lots of "Rolled brown" rubber. The stocks were compounded as follows:

Stock A
"Rolled brown" _____ 94.65
Zinc oxide _____ 2.0
Sulphur _____ 3.0
Alpha ethyl beta propyl acryl aniline abietate _____ 0.35

Stock B
"Rolled brown" _____ 94.15
Zinc oxide _____ 2.0
Sulphur _____ 3.0
Alpha ethyl beta propyl acryl aniline abietate _____ 0.35
Ammonium acetate _____ 0.5

| Cure | "Rolled brown" lot #1 | | | | "Rolled brown" lot #2 | | | |
|---|---|---|---|---|---|---|---|---|
| | Stock A | | Stock B | | Stock A | | Stock B | |
| | Tensile | Elongation | Tensile | Elongation | Tensile | Elongation | Tensile | Elongation |
| | | Per cent | | Per cent | | Per cent | | Per cent |
| 5' x 60# | 935 | 790 | 1880 | 680 | 505 | 900 | 1570 | 800 |
| 10' x 60# | 825 | 770 | 2100 | 680 | 900 | 840 | 2270 | 760 |
| 15' x 60# | 565 | 770 | 2380 | 670 | 895 | 810 | 2565 | 780 |
| 20' x 60# | 535 | 760 | 2520 | 660 | 825 | 770 | 2560 | 750 |
| 25' x 60# | 520 | 720 | 2960 | 680 | 650 | 800 | 2810 | 720 |
| 30' x 60# | 530 | 710 | 2510 | 670 | 710 | 810 | 2750 | 710 |

The above results demonstrate the "evening-out" characteristic of the above ingredients.

EXAMPLE 7

To demonstrate the advantage derived from the use of hydrated sodium acetate in conjunction with a low grade inferior rubber, commonly termed "Rolled brown crepe" and accelerated with alpha ethyl beta propyl acryl aniline abietate the following results are given.

It is to be noted, that, in general, each individual bale of this rubber varies as to vulcanization characteristics, when incorporated into a commercial rubber mix, and generally yields a vulcanized rubber of very inferior qualities.

The following table of figures shows the results obtained with ten different lots of "Rolled brown" showing the effect of hydrated sodium acetate in a stock accelerated with alpha ethyl beta propyl acryl aniline abietate.

The recipes consist of the following:

Stock A
Rubber _____ 94.65
Zinc oxide _____ 2.0
Sulphur _____ 3.0
Alpha ethyl beta propyl acryl aniline abietate _____ 0.35

Stock B
Rubber _____ 93.9
Zinc oxide _____ 2.0
Sulphur _____ 3.0
Alpha ethyl beta propyl acryl aniline abietate _____ 0.35
Hydrated sodium acetate _____ 0.75

| Lot No. | Cure: 30' x 40# steam pressure per square inch (287° F.) | | | |
|---|---|---|---|---|
| | Stock A | | Stock B | |
| | Tensile | Elongation | Tensile | Elongation |
| | | Per cent | | Per cent |
| 1 | 1510 | 770 | 2820 | 740 |
| 2 | 480 | 720 | 2980 | 720 |
| 3 | 510 | 720 | 2940 | 730 |
| 4 | 2660 | 760 | 3030 | 710 |
| 5 | 2740 | 740 | 3250 | 700 |
| 6 | 1500 | 840 | 3150 | 710 |
| 7 | 950 | 930 | 3020 | 730 |
| 8 | 2700 | 730 | 2950 | 710 |
| 9 | 1080 | 860 | 2790 | 700 |
| 10 | 960 | 850 | 3210 | 700 |

The above results show the correction of variability and the improvement in physical qualities of an inferior rubber when hydrated sodium acetate is added to the rubber mix as above.

EXAMPLE #8

To illustrate the advantage derived from the use of hydrated sodium acetate in conjunction with a low grade rubber, commonly termed, "Blanket crepe" and accelerated with alpha ethyl beta propyl acryl aniline abietate a series of ten different lots of this rubber were compounded and tested for vulcanization and tensile strength.

The stocks were compounded as follows:

Stock A
Rubber _____ 94.65
Zinc oxide _____ 2.0
Sulphur _____ 3.0
Alpha ethyl beta propyl acryl aniline abietate _____ 0.35

Stock B
Rubber _____ 93.9
Zinc oxide _____ 2.0

| | |
|---|---|
| Sulphur | 3.0 |
| Alpha ethyl beta propyl acryl aniline abietate | 0.35 |
| Hydrated sodium acetate | 0.75 |

| Lot No. | Cure 30' x 40# steam pressure (287° F.) | | | |
|---|---|---|---|---|
| | Stock A | | Stock B | |
| | Tensile | Elongation | Tensile | Elongation |
| | | Per cent | | Per cent |
| 1 | 1630 | 840 | 3140 | 780 |
| 2 | 1540 | 860 | 3560 | 760 |
| 3 | 2680 | 820 | 3200 | 790 |
| 4 | 1960 | 850 | 3200 | 770 |
| 5 | 920 | 800 | 3040 | 790 |
| 6 | 1560 | 850 | 3080 | 770 |
| 7 | 930 | 820 | 3320 | 760 |
| 8 | 1280 | 850 | 2980 | 790 |
| 9 | 450 | 740 | 3080 | 780 |
| 10 | 2700 | 810 | 3500 | 760 |

EXAMPLE #9

To illustrate the use of potassium acetate in a "Rolled brown crepe" rubber stock accelerated with alpha ethyl beta propyl acryl aniline, the following example is given.

Two rubber compounds were mixed using the same sample of rubber and identical curing conditions throughout the test.

The stocks used were as follows:

Stock A
| | |
|---|---|
| "Rolled brown" | 100 |
| Zinc oxide | 10 |
| Sulphur | 3 |
| Alpha ethyl beta propyl acryl aniline | 0.35 |

Stock B
| | |
|---|---|
| "Rolled brown" | 100 |
| Zinc oxide | 10 |
| Sulphur | 3 |
| Alpha ethyl beta propyl acryl aniline | 0.35 |
| Potassium acetate | 0.75 |

| Cure | Stock A | | Stock B | |
|---|---|---|---|---|
| | Tensile | Elongation | Tensile | Elongation |
| | | Per cent | | Per cent |
| 10' x 40# | | | 390 | 930 |
| 20' x 40# | 665 | 830 | 2375 | 780 |
| 30' x 40# | 1060 | 910 | 2740 | 720 |
| 40' x 40# | 1170 | 830 | 2790 | 710 |
| 50' x 40# | 1260 | 760 | 2840 | 700 |
| 60' x 40# | 1180 | 760 | 2880 | 720 |

What I claim is:

1. A method of producing a rubber article which comprises incorporating in the rubber stock or compound a monovalent salt of acetic acid, forming the desired article from the compound, and vulcanizing the same.

2. A method of producing a rubber article which comprises incorporating in the rubber stock or compound an organic accelerator and a monovalent salt of acetic acid, forming the desired article from the compound, and vulcanizing the same.

3. The method of preventing the variation and improving the vulcanization of rubber which consists in adding sodium acetate to the rubber and vulcanizing the product.

4. The method of preventing the variation and improving the vulcanization of rubber, which consists in adding to the rubber an organic accelerator and sodium acetate and vulcanizing the product.

5. A rubber stock comprising unvulcanized rubber and a monovalent salt of acetic acid.

6. A rubber stock comprising unvulcanized rubber, a monovalent salt of acetic acid, and an organic accelerator.

7. The method described in claim 1, in which the salt is in a hydrated form.

8. The method described in claim 1, in which the salt is sodium acetate.

9. The method described in claim 1, in which the salt is hydrated sodium acetate.

10. The method described in claim 2, in which the salt is in the hydrated form.

11. The rubber stock described in claim 5, in which the salt is in a hydrated form.

12. The rubber stock described in claim 6, in which the salt is in a hydrated form.

In testimony whereof, I affix my signature.

HAROLD A. MORTON.